United States Patent
Ibata et al.

(10) Patent No.: US 6,563,242 B2
(45) Date of Patent: May 13, 2003

(54) SLIM MOTOR AND DEVICES MOUNTING THE SAME MOTOR

(75) Inventors: Eiichi Ibata, Tottori (JP); Toshiaki Tsuzaki, Tottori (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 96 days.

(21) Appl. No.: 09/788,964

(22) Filed: Feb. 20, 2001

(65) Prior Publication Data

US 2002/0047388 A1 Apr. 25, 2002

(30) Foreign Application Priority Data

Feb. 18, 2000 (JP) ......................... 2000-040611

(51) Int. Cl.[7] .................. H02K 33/04; H02K 23/58
(52) U.S. Cl. .................. 310/90; 310/67 R; 310/263; 310/81; 310/40
(58) Field of Search .................. 310/90, 81, 750, 310/263, 90.5, 36, 905, 40

(56) References Cited

U.S. PATENT DOCUMENTS

| | | | | |
|---|---|---|---|---|
| 3,514,654 A | * | 5/1970 | Moresi ...................... 310/266 |
| 4,412,146 A | * | 10/1983 | Futterer et al. ............. 310/266 |
| 5,107,155 A | * | 4/1992 | Yamaguchi ................. 310/81 |
| 5,270,602 A | * | 12/1993 | Takehara ..................... 310/198 |
| 5,341,057 A | * | 8/1994 | Yamaguchi et al. .......... 310/81 |
| 5,373,207 A | * | 12/1994 | Yamaguchi et al. .......... 310/81 |
| 5,621,260 A | * | 4/1997 | Fukuoka et al. ......... 310/154.04 |
| 5,780,947 A | * | 7/1998 | Fukuoka et al. ............... 310/80 |
| 5,952,745 A | * | 9/1999 | Yasuda ................. 310/40 MM |
| 6,388,349 B1 | * | 5/2002 | Ioka et al. ..................... 310/71 |

FOREIGN PATENT DOCUMENTS

| | | | | |
|---|---|---|---|---|
| JP | 06284662 | * | 7/1994 | .......... H02K/29/00 |
| JP | 07107698 | * | 4/1995 | .......... H02K/7/065 |
| JP | 067449 A | * | 11/1996 | .......... H02K/7/065 |
| JP | 08298746 | * | 11/1996 | .......... H02K/7/065 |
| JP | 09037510 | * | 2/1997 | .......... H02K/7/065 |
| JP | 2761175 | | 3/1998 | |
| JP | 2789447 | | 6/1998 | |
| JP | 01169746 | * | 3/1999 | .......... H02K/23/58 |
| JP | 011098756 | * | 4/1999 | ............ H02K/5/22 |
| JP | 050597 A | * | 2/2000 | .......... H02K/23/58 |
| JP | 2000134865 | * | 5/2000 | .......... H02K/7/065 |
| JP | WO 01/08286 | * | 7/2000 | ............ H02K/5/22 |
| JP | 295830 A | * | 10/2000 | .......... H02K/23/58 |
| JP | WO 00/60725 | * | 12/2000 | .......... H02K/23/58 |
| JP | 2001037147 | * | 2/2001 | ............ H02K/5/22 |

* cited by examiner

*Primary Examiner*—Nestor Ramirez
*Assistant Examiner*—Heba Y. M. Elkassabgi
(74) *Attorney, Agent, or Firm*—RatnerPrestia

(57) ABSTRACT

A slim motor good for a portable device includes a frame, pipe, magnet, coil, shaft, first bearing and a second bearing (inside bearing). The pipe is disposed on an inner wall of the cylindrical magnet, and an outer diameter of the second bearing is set at approx. the same as that of the pipe. The second bearing is aligned to the pipe in an axial direction and fixed on the inner wall of the magnet. This structure allows the magnet to extend axially long enough, and solves conventional problems including power consumption, slant of the shaft, motor efficiency, productivity and the like, thereby contributing to achieving a slimmer motor and a slimmed-down device.

20 Claims, 9 Drawing Sheets

SLIM MOTOR AND DEVICES MOUNTING THE SAME MOTOR

FIELD OF THE INVENTION

The present invention relates to a slim motor and a device, e.g. a portable information device, mounting the same motor. More particularly, it relates to an innovative motor structure allowing to reduce a diameter of the motor, and a device mounting this motor thereby downsizing itself.

BACKGROUND OF THE INVENTION

Portable devices include portable audio & video devices such as a headphone stereo player, a portable digital versatile disc (DVD), and portable information devices such as a cellular phone. A motor is used as a power source of the portable audio & video devices, and another motor is used as a vibration generator of the portable information device to inform a user of a call with tactile vibrations. In the markets of those products, downsizing and weight reducing are critical criteria to get a greater market share. In the market of portable information devices, among others, fierce competition is going on to achieve a target of "thinner by one millimeter than others." This market situation entails a severe request to the motor to be slimmer and slimmer.

Japanese Patent Publication No. 2761175 discloses one of the motors adequate for the portable information device. This motor is a cylindrical core-less motor generating vibrations and mounted to a cellular phone. As shown in FIG. 8, shaft 74, bearings 75, 76, and bearing holder 77 are separately disposed in an axial direction with respect to magnet 71, rotor coil 72 and housing 73. In the motor having this structure, three elements, namely, the magnet, coil and housing, are disposed concentrically in the radius direction. The shaft, both the bearings and the bearing holder are also disposed concentrically in the radius direction.

The diameter of this motor can be reduced because two sets of three elements disposed in the radius direction are aligned. However, as shown in FIG. 8, this structure not only makes shaft 74 shorter but also makes itself complicated. Therefore, when side pressure is applied to shaft 74, load to the shaft increases, which inclines the motor to consume more current and tends to tilt the shaft. As a result, the motor may invite lowering quality and reliability. Further, since the shaft tends to tilt, an annular space between magnet 71 and coil 72 is obliged to be wide as a countermeasure against the tilt, and this lowers motor's efficiency. In addition, the complicated structure of the motor lowers the productivity, which increases the manufacturing cost.

The easiness of shaft's tilting is described hereinafter. As shown in FIG. 8, an axial length of coil 72 is twice as long as the space between bearings 75 and 76. Thus a tilt of shaft 74 produced at the bearings is approx. doubled to a displacement of the coil in a radius direction. This problem is essential to the motor having such a structure. In order to deal with this problem, countermeasures are required such as increasing accuracy or rigidity of the bearing, and widening a space between the coil and the magnet or the housing for preventing these elements from touching with each other.

Japanese Patent Publication No. 2789447 discloses another example. This motor generates vibration and is mounted also to a cellular phone. As shown in FIG. 9, this motor is different from the motor discussed previously because a shaft of this motor extends through a magnet, and yet it tries to reduce the diameter thereof.

In FIG. 9, lower section 81a of pipe-like bearing house 81 extends from a lower end of magnet 82, and bearing 83 is mounted to an outer wall of lower section 81a. Thus bearing 83 is disposed outside magnet 82, therefore, an outer diameter of the motor slims down by the thickness of the bearing.

As such, the magnet and bearing are aligned in the axial direction. This construction allows the outer diameter of the motor to be slim. In this construction, a shaft is so long enough in the axial direction that no such a problem discussed previously occurs.

In this construction, however; magnet 82, bearing 83 and mounting section 83a are aligned within a length of rotor coil 84 in the axial direction. Therefore, magnet 82 must be shortened by the total length of bearing 83. Thus coil 84 has a non-active section which does not interlink with magnetic flux from magnet 82, which lowers the efficiency of the motor.

In the two conventional cases discussed above, the magnet and the bearing are disposed separately so that the two elements are not overlaid in the axial direction, thereby slimming down the motor. Indeed, the shift of both the elements in the axial direction is advantageous for slimming down the motor, but this structure invites the problems discussed above.

When a cylindrical motor, as a vibration generator, is mounted to a portable device, not only slimming down the motor per se, but other peripheral elements such as a holder of the motor and an eccentric weight should be taken into consideration. Then an overall shape must be decided at an optimum balance of all the elements. Otherwise, it is not possible to obtain a thin motor producing greater vibrations with lower power consumption.

SUMMARY OF THE INVENTION

The present invention addresses the problems discussed above and aims to provide a motor having a structure allowing further slim down thereof, and thereby contributing to downsizing as well as weight reducing a device to which the motor is mounted.

The motor of the present invention comprises the following elements:
(a) a frame;
(b) a pipe disposed in the frame and fixed coaxially with the frame;
(c) a magnet of which inner wall fits in the pipe;
(d) a coil facing an outer wall of the magnet via an annular space;
(e) a shaft disposed coaxially with the magnet and the coil, and coupled to the coil;
(f) a first bearing disposed at the end of the frame and journaling a first side of the shaft; and
(g) a second bearing (inside bearing) disposed inside the frame and journaling a second side of the shaft.

A length of the magnet is such that a lower end of the magnet overreaches a lower end of the pipe, and the second bearing is disposed under the lower end of the pipe thereby fixing the bearing per se on the inner wall of the magnet.

In this structure, the second bearing is aligned with the pipe in an axial direction, so that the second bearing is disposed on the inner wall of the magnet. Therefore, a length of the magnet can extend by the length of the second bearing, so that magnetic flux traveling from the magnet to the coil can increase accordingly. As a result, the motor can be slimmed down and an excellent motor efficiency can be achieved.

Another motor of the present invention comprises the following elements:

(a) a frame;
(b) a pipe disposed in the frame, fixed coaxially with the frame;
(c) a magnet of which inner wall fits in the pipe;
(d) a coil facing an outer wall of the magnet via an annular space;
(e) a shaft disposed coaxially with the magnet and the coil, and coupled to the coil;
(f) a first bearing disposed at the end of the frame and journaling a first side of the shaft;
(g) a second bearing (inside bearing) disposed inside the frame and journaling a second side of the shaft; and
(h) an eccentric weight having a weight section and a fixing section of the weight section to the shaft.

An outer diameter of the weight section is greater than that of the frame, and an axial length of the weight section is longer than that of the fixing section. An axial position of a gravity center of the eccentric weight is within an axial length of the first bearing.

This structure allows the motor to slim down while maintaining necessary vibrations with the eccentric weight of a large diameter. Most of load to the rotor is borne by the first bearing and thus little load is borne by the second bearing.

A device of the present invention has the following structure: The device mounts the motor discussed above, and the motor is mounted to the device with a holder made of soft material.

Another device of the present invention comprises the following elements:
(a) a housing;
(b) the motor discussed above and mounted to the housing; and
(c) a device board including an electric coupling section through which the coil is powered via a powering terminal exposed outside the motor frame.

These construction allow the device to downsize and reduce its weight thanks to the slim motor. As a result, a portable device with phenomenal portability is achievable. A device with the motor having the eccentric weight can be slimmed down, and has an advantage of informing its user of a calling because large vibrations are generated when the calling arrives at the device.

DETAILED DESCRIPTION OF THE EXEMPLARY EMBODIMENTS

Exemplary embodiments of the present invention are demonstrated hereinafter with reference to the accompanying drawings.

(First Exemplary Embodiment)

Figure 1:
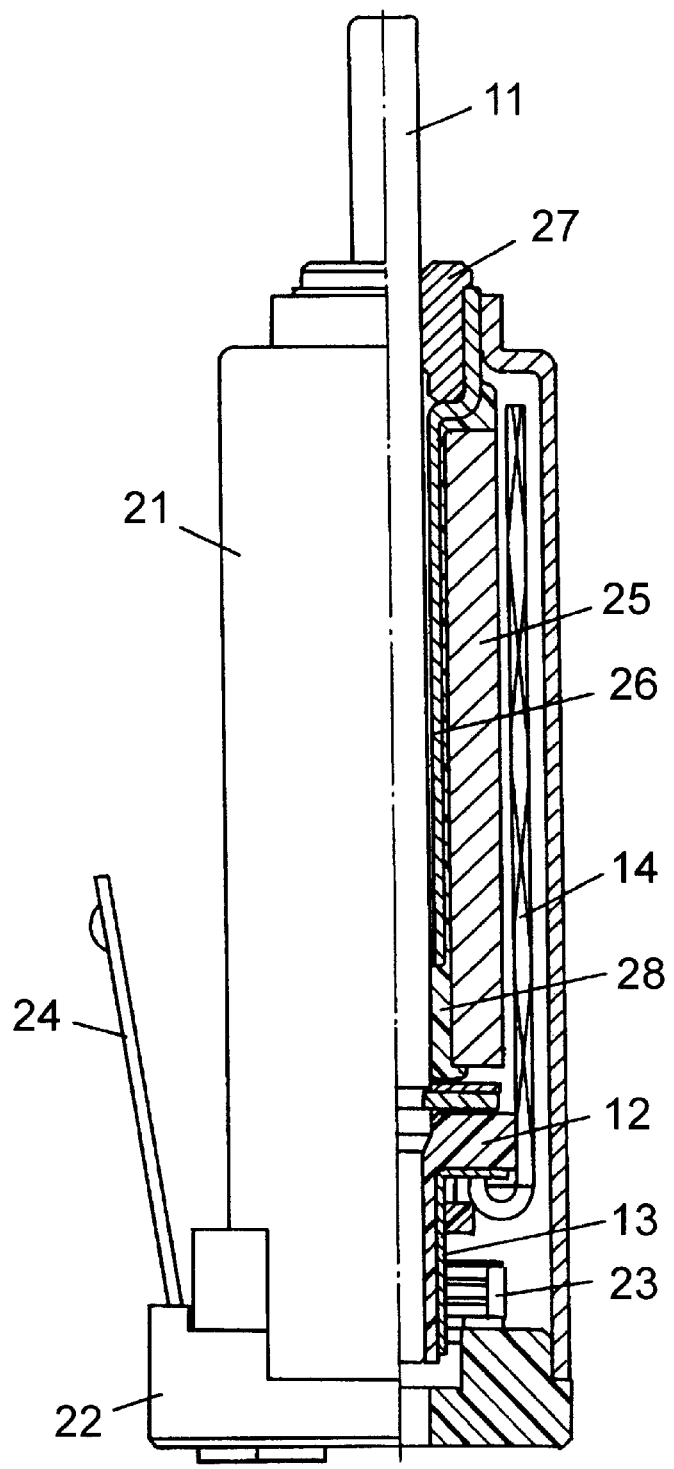
FIG. 1 is a half cross sectional view showing a structure and an outlook of a motor in accordance with a first exemplary embodiment of the present invention.
Figure 2A:
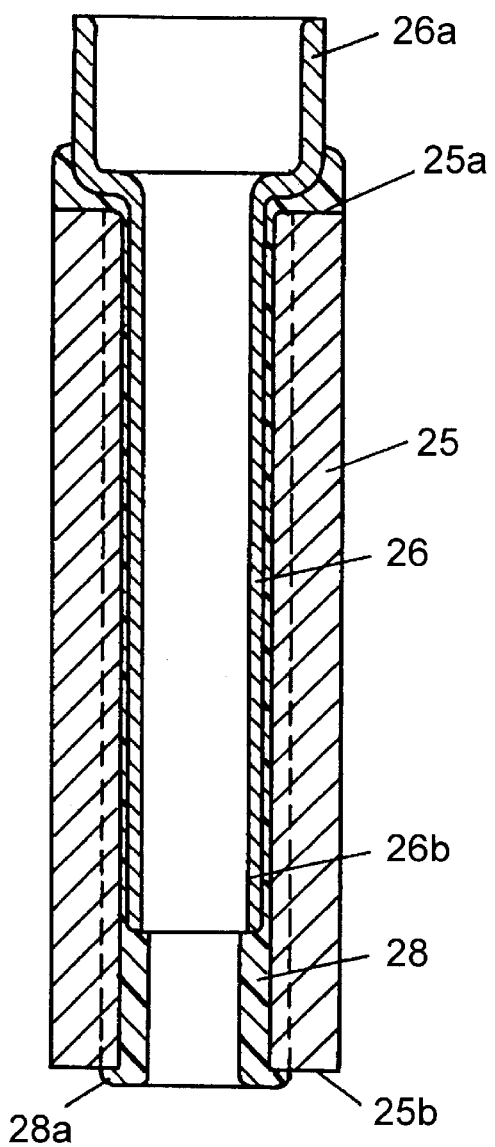
FIG. 2A is an enlarged lateral cross section showing a magnet, pipe and inside bearing of the motor shown in FIG. 1.
Figure 2B:
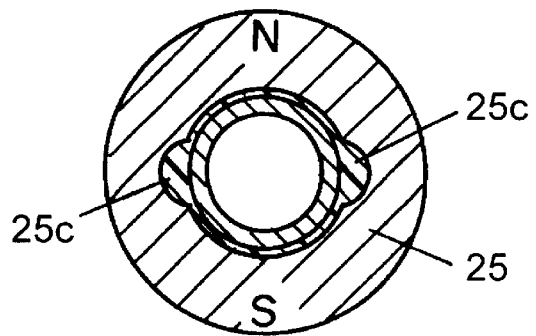
FIG. 2B is a cross section from the top of what are shown in FIG. 2A.
Figure 3A:
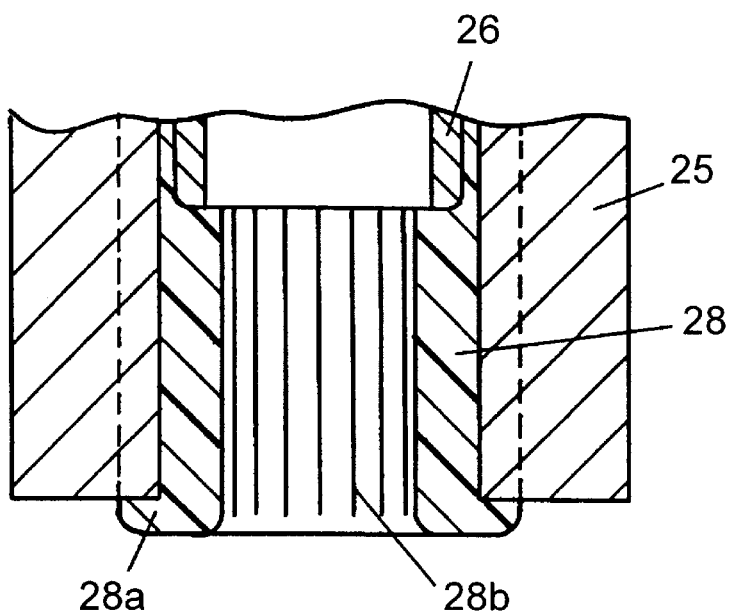
FIG. 3A is an enlarged lateral cross section showing vicinity of the inside bearing of the motor shown in FIG. 1.
Figure 3B:
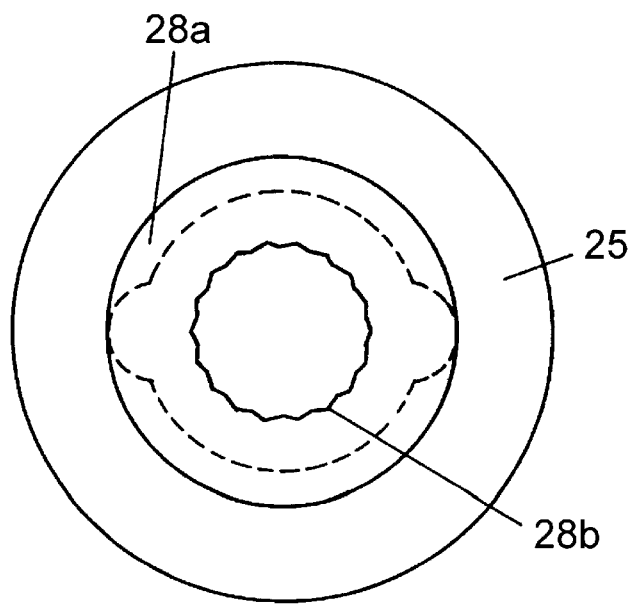
FIG. 3B is a plan view of the motor viewed from an end of the motor.

FIG. 1 is a half cross sectional view showing a structure and an outlook of a motor in accordance with the first exemplary embodiment of the present invention. FIG. 2A is an enlarged lateral cross section showing a magnet, pipe and inside bearing of the motor shown in FIG. 1. FIG. 2B is a cross section from the top of what are shown in FIG. 2A. FIG. 3A is an enlarged lateral cross section showing vicinity of the inside bearing of the motor shown in FIG. 1. FIG. 3B is a plan view of the motor viewed from an end of the motor.

In FIG. 1, the motor includes a rotor (entire rotating section) and a stator (entire stationary section.) The motor is a cylindrical core-less motor, and dimensions of the motor is, e.g., diameter: 4 mm, length: 8 mm, and weight: 0.43 g. The rotor spins on shaft 11. Commutator base 12 is mounted to a lower end of shaft 11 and holds commutator 13 on an outer wall of base 12. An end of rotor coil 14 is coupled to base 12. An upper end of shaft 11 extends outside the motor as an output shaft.

An outer fence of a stator is formed by frame 21. Frame 21 is a slim cylinder, and its opening is closed by bracket 22. Bracket 22 has brush 23 sliding with respect to commutator 13, and has two leaf springs 24 protruding outside the motor. Brush 23 is electrically conductive with leaf springs 24 in bracket 22. Inside frame 21, magnet 25 magnetized is disposed coaxially with frame 21. Further, pipe 26 is disposed on the side of inner wall of magnet 25. First bearing 27 (outside bearing) is disposed in an upper end of frame 21, and second bearing 28 (inside bearing) is disposed in frame 21. A first side of shaft 11 is journaled by bearing 27, and a second side of shaft 11 is journaled by bearing 28.

A length of magnet 25 is set such that a lower end of magnet 25 overreaches a lower end of pipe 26. Bearing 28 is rigidly mounted on an inner wall of magnet 25 at a section lower than the lower end of pipe 26.

In this motor, magnetic field of the stator is formed by magnet 25 and frame 21. Magnet 25 is magnetized N and S poles in a radius direction. In other words, a magnetic circuit is formed such that magnetic flux generated from the N pole of magnet 25 travels to the S pole thereof via frame 21 made of ferromagnetic substance. If pipe 26 is made of ferromagnetic substance, pipe 26 contributes to lowering magnetic resistance of this magnetic circuit and increasing the magnetic flux. A current, fed from a power source of a device to which the motor is mounted, travels in coil 14 via leaf spring 24 in the axial direction so that the current lies at right angles to the magnetic field, thereby spinning the coil 14. Then shaft 11 coupled to coil 14 drives a mechanism of the device.

The motor in accordance with the first embodiment has main features at the mechanism of shaft 11 and its vicinity. The features are detailed hereinafter with reference to FIGS. 2A and 2B.

In FIGS. 2A and 2B, magnet 25 is a hollow cylinder, and pipe 26 fits in the inner wall of magnet 25. An inner diameter of first end section 26a of pipe 26 is larger than that of the magnet so that bearing 27 (not shown in FIG. 2A) can be fit into pipe 26. Second end section 26b of pipe 26 is fit in magnet 25, and a lower end of second end section 26b is short of lower end 25b of magnet 25, and bearing 28 is disposed at the shorted section.

Bearing 28 is made of resin usable for injection molding. The resin forms not only bearing 28 but also flange 28a on an end face of bearing 28. Flange 28a has a larger diameter than an inner diameter of magnet 25. Flange 28a functions as a sliding face with respect to the rotor, and bears thrust load. At the injection molding, molded resin also fills in a space between the inner wall of magnet 25 and the outer wall of pipe 26, thereby positioning as well as fixing both the elements. Further, the molded resin fills in a space between pipe end 26a and upper face 25a of magnet 25, thereby fixing these elements. The molded resin, as such, sandwiches the upper and lower ends of magnet 25, so that a strong structure as a whole is formed.

Magnet 25 has two grooves 25c running in the axial direction on its inner wall. Since this motor is very slim, a space between the inner wall of magnet 25 and the outer wall of pipe 26 is narrow. On the other hand, because the resin, injection-molded, functions in part as a bearing, its fluidity is lower than other resin mainly aiming at molding. In this condition, grooves 25c thus functions as giving sufficient fluidity to the molded resin, thereby obtaining quality moldings. Generally speaking, grooves 25c reduce magnetic flux by the volume of grooves 25c, however; when the grooves lie at right angles to a magnetizing direction of magnet 25, the reduction of magnetic flux can be alleviated. For this purpose, a positioning section for grooves 25c is preferably formed on the outer wall or the end face of magnet 25, or magnetizing is preferably carried out beforehand referencing to the grooves.

As shown in FIGS. 3A and 3B, a plurality of grooves 28b are formed on an inner wall of bearing 28 in the axial direction. Resin, in general, has a lower lubricant-retaining-rate than sintered metal forming the bearing, thus the grooves are to retain lubricant in the vicinity of bearing 28. Instead of these grooves running in the axial direction, the lubricant retainer may be a spiral groove, independent grooves in a rim direction, crossing spiral grooves such as double-cut knurling, or numbers of recesses arranged.

Figure 8:
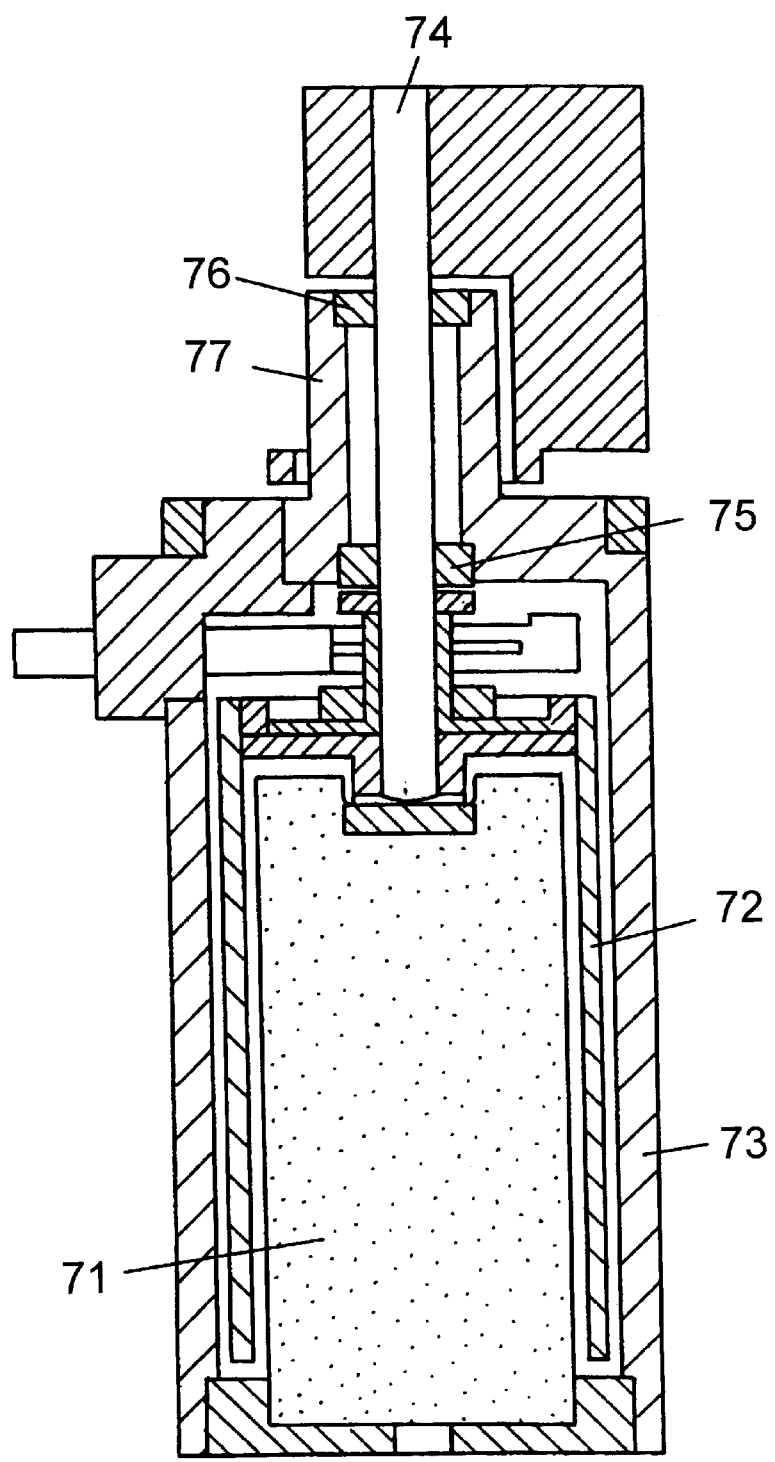
FIG. 8 is a cross section showing a construction of a conventional vibration generating motor.
Figure 9:
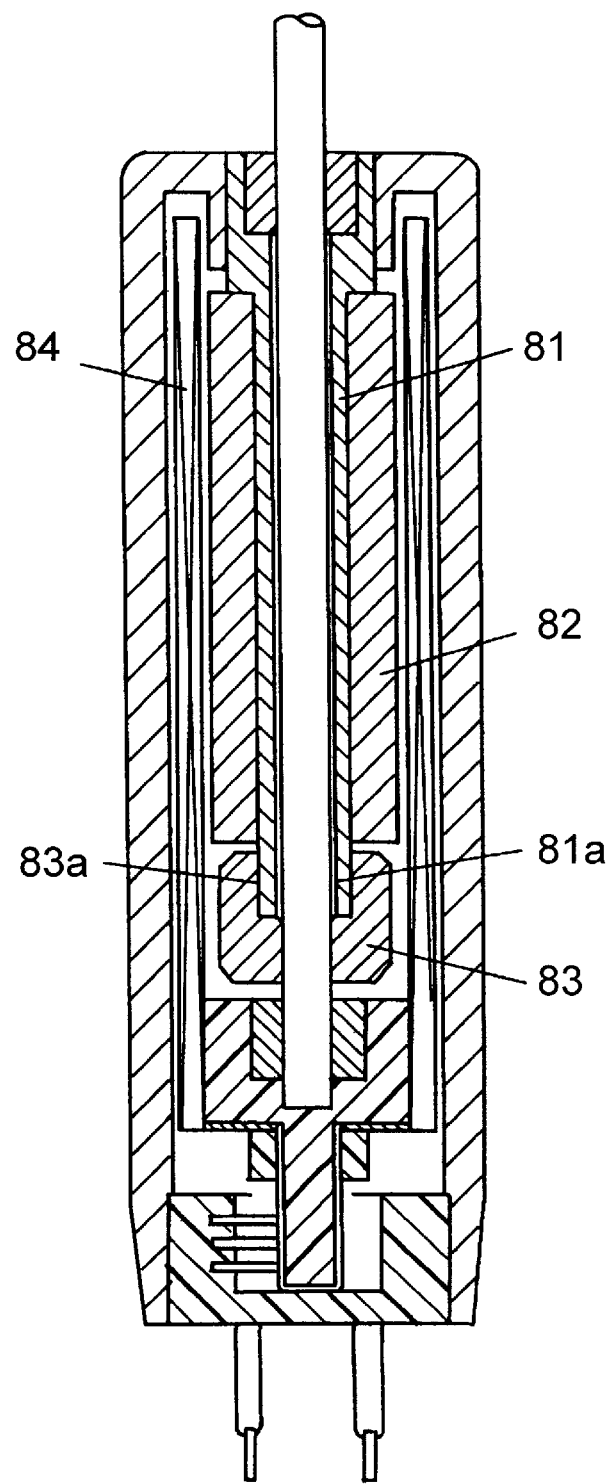
FIG. 9 is a cross section showing a construction of a conventional cylindrical core-less motor.

As such, in the motor used in the first embodiment of the present invention, the inside bearing is aligned with the pipe in the axial direction on the inner wall of the magnet, instead of conventionally aligning the inside magnet with the magnet in the axial direction. Accordingly, it does not need to shorten the magnet by the length of the inside bearing as illustrated in FIG. 8 where a conventional case is shown, and interlinkage of magnetic flux between the magnet and coil can be increased to an original amount. In general, both the ends of coil do not generate torque, therefore, the magnet does not need to cover both the coil ends, however; the section of coil where extended magnet covers due to the present invention generates the torque. As a result, the structure allows the motor used in this embodiment to downsize and consume less current.

In this embodiment, the outer diameter of the inside bearing (second bearing) is approx. as same as that of the pipe, thus the bearing has very small diameter and it does not lose the volume of the magnet, and yet increases the magnetic flux of the magnet. As a result, downsizing and low power consumption are achieved in this motor. Further, the inner wall of the magnet forms a simple shape, thus the magnet can be manufactured with ease, and the motor can be also assembled with ease. An inexpensive motor with high productivity is thus obtainable.

In the motor used in the first embodiment, the inside bearing is aligned in the axial direction with the pipe disposed on the inner wall of the magnet, and also the inside bearing is insert-molded so that the outer wall of the magnet is coaxial with the inner wall of the inside bearing. This structure is different from the one where an inside bearing is manufactured in another process and then it fits in the magnet. According to this structure, the position and accuracy of the inner diameter of the inside bearing fully depends on the mold per se. Thus a concentric accuracy can be improved, which increases the quality of the motor. Further, in this structure, the inner wall of the magnet can be coupled with the outer wall of the inside bearing by molding. Since the coupling of both the elements can be thus strengthened, no positional shift of the bearing is expected, and a motor of high reliability is obtainable. Since this motor is very tiny, it is hard, in general, to mold and assemble an inside bearing, however, thanks to the present invention, the inside bearing can be manufactured with high productivity, which contributes to downsizing the motor and lowering the cost thereof Further, the outer wall of the magnet and the inner wall of the inside bearing can be retained and injection-molded by the mold, therefore, another process for regulating both of the outer wall of the magnet and inner wall of the inside bearing is not needed. As a result, the productivity is improved and the cost is lowered.

In the motor used in the first embodiment, the magnet is coupled with at least one of the pipe or the frame by insert-molding, and the inside bearing is disposed on the inner wall of the magnet, so that the inside bearing is aligned with the pipe in the axial direction. The coupling of the magnet to the pipe and the frame, and the forming of the inside bearing are simultaneously carried out, therefore, a process of fixing the magnet to pipe and the inside bearing can be eliminated. As a result, an inexpensive motor with high productivity is obtainable. A plurality of elements are simultaneously positioned thereby forming the bearing, thus a tolerance can be narrower than a case where the bearing undergoes numbers of steps before being formed. Further, since both of the magnet's ends are rigidly held, the magnet can be firmly retained, thus the reliability of the motor is improved.

The motor used in the first embodiment has grooves running in the axial direction on magnet's inner wall. These grooves allow resin, solder or adhesive to flow onto magnet's wall with ease, which easily couples ultra-mini elements to each other with small spaces in between. In particular, an advantage of simplifying the insert-molding is remarkable. This advantage allows oleo-resin—superior in bearing performance but inferior in fluidity—to be employed, then a motor of high productivity and excellent bearing performance can be obtained.

In the motor used in the first embodiment, a flange is formed on the end face of the magnet. An outer diameter of the flange is greater than an inner diameter of the magnet. Therefore, the magnet's end face is protected, and no sliding washer is required, so that the motor is good at volume production.

The motor used in the first embodiment has grooves, as lubricant retainers, running in the axial direction or a rotating direction on an inner wall of the inside bearing. The grooves can retain lubricant, thereby improving lubrication performance of the inside bearing. Thus a motor of superior bearing performance is obtainable.

(Second Exemplary Embodiment)

Figure 4A:
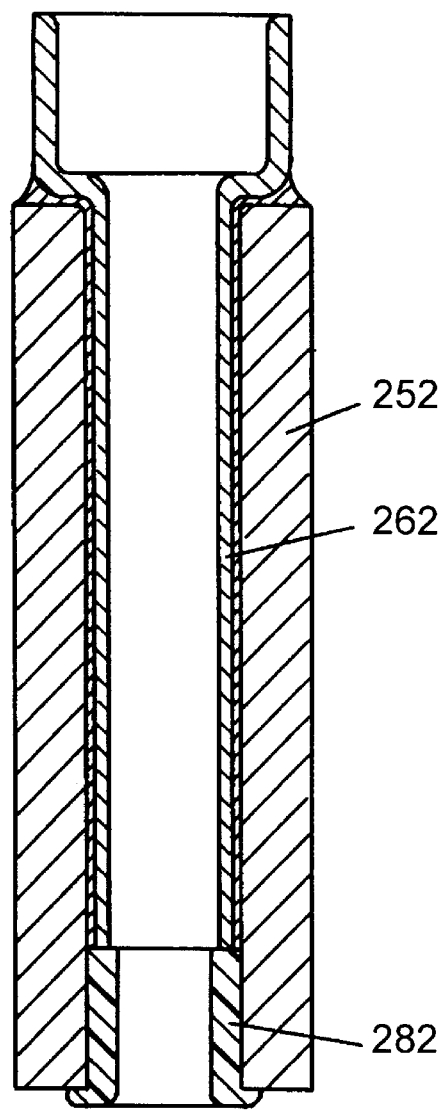
FIG. 4A is an enlarged lateral cross section showing vicinity of an inside bearing of a motor in accordance with a second exemplary embodiment of the present invention.
Figure 4B:
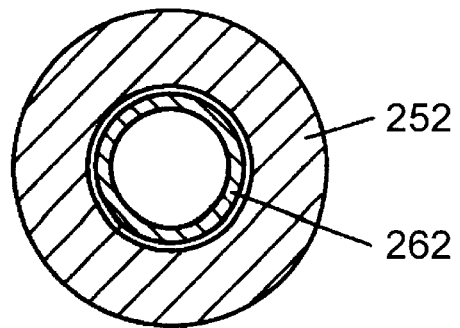
FIG. 4B is a plan view of the motor viewed from an axial end.

FIG. 4A is an enlarged lateral cross section showing vicinity of an inside bearing of a motor in accordance with the second exemplary embodiment of the present invention. FIG. 4B is a plan view of the motor viewed from an axial end.

The second embodiment differs from the first one in the following point. In the second embodiment, as shown in FIGS. 4A and 4B, a member forms bearing 282, and another member fills in a space between an inner wall of magnet 252 and an outer wall of pipe 262. This another member also positions the magnet 252 and pipe 262. In this second embodiment, the space discussed above is bonded with soldering, and this partially fabricated item is put into a mold so that bearing 282 is insert-molded. This structure allows the space discussed above to be filled with solder of excellent fluidity for fixing both of magnet 252 and pipe 262, while bearing-function-oriented molding material can be selected for bearing 282. The material filling in the space can be resin or adhesive of high fluidity. The second embodiment expects not only the same advantages as the first one, but also expects a motor of a longer service life and higher reliability.

(Third Exemplary Embodiment)

Figure 5:
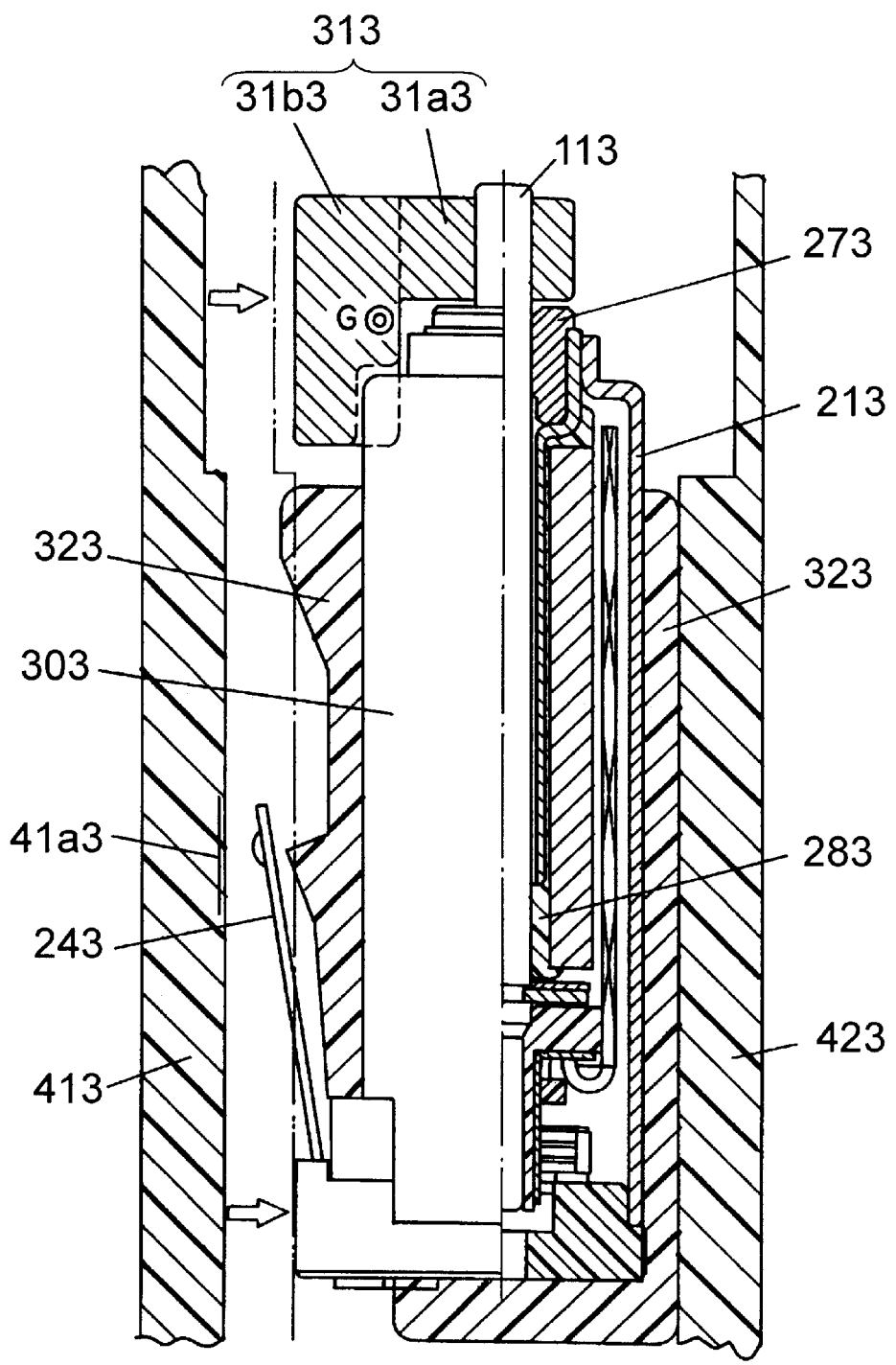
FIG. 5 is a lateral view showing a motor in accordance with a third exemplary embodiment together with a board of a device to which the motor is mounted.
Figure 6A:
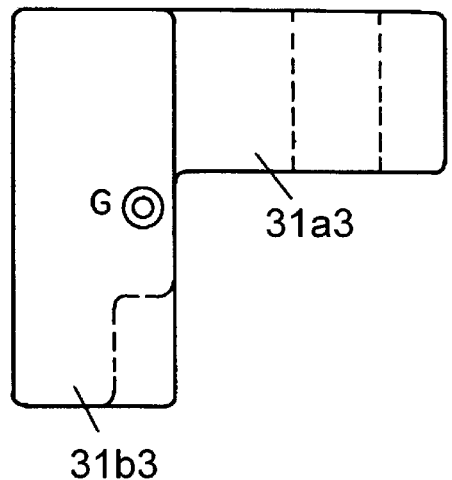
FIG. 6A is a lateral view of an eccentric weight of the motor shown in FIG. 5.
Figure 6B:
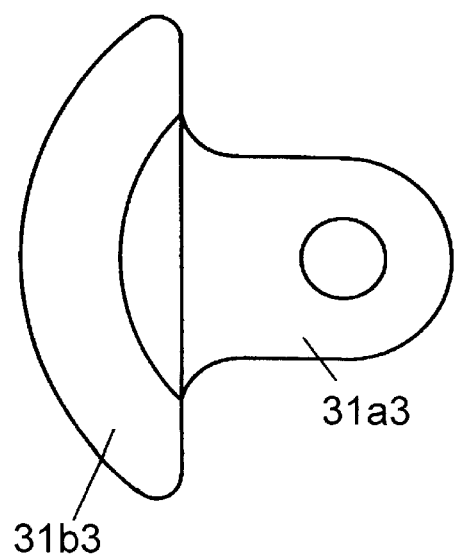
FIG. 6B is a plan view of the eccentric weight shown in FIG. 6A.

FIG. 5 is a lateral view showing a motor in accordance with the third exemplary embodiment together with a board of a device to which the motor is mounted. FIG. 6A is a lateral view of an eccentric weight of the motor shown in FIG. 5. FIG. 6B is a plan view of the eccentric weight shown in FIG. 6A. The third embodiment refers to a vibration-generating-motor mounted to a cellular phone or the like and informing a user of a calling with vibrations.

In FIG. 5, the motor in accordance with the third embodiment comprises a cylindrical core-less motor 303 having eccentric weight 313. Holder 323 made of soft material such as rubber is mounted to motor 303. Board 413 of a device is disposed on a side closer to two leaf springs' terminals 243 of the motor. Housing 423 of the device is disposed on the other side. Powering lands 41$a$3-electric coupling sections-corresponding to terminals 243 are formed on board 413. When motor 303 is urged to board 413, lands 41$a$3 contact to terminals 243 to power motor 303.

Motor 303 is sandwiched by housing 423 and board 413 with holder 323 in between. When being powered in this condition, the motor spins and generates vibrations. The vibrations travel to the housing of a device via holder 323, and vibrate the device. Holder 323 functions as the following three jobs. (a) retaining the motor elastically by deforming the holder itself elastically when the motor is integrated into the device; (b) damping a shock to the motor and the device when the device drops; and (c) transmitting the vibrations to the device housing.

Motor 303 comprises the following elements:
(a) slim cylindrical frame 213;
(b) shaft 113;
(c) bearing 273 disposed on an end of the frame and journaling a first side of the shaft; and
(d) bearing 283 disposed inside the frame and journaling a second side of the shaft.

Eccentric weight 313, as shown in FIGS. 6A and 6B, comprises shaft fixing section 31$a$3 and weight section 31$b$3. An outer diameter of weight section 31$b$3 is greater than that of frame 213, and an axial length of weight section 31$b$3 is longer than that of fixing section 31$a$3. This structure allows the gravity center G of eccentric weight 313 to fall within an area of bearing 273 (within a height of bearing 273.)

In the motor used in the third embodiment, weight 313 has a larger outer diameter than that of frame 213, and has a rotating area of which outer diameter is the same as or a little bit larger than that of holder 323. In many conventional cases, as shown in FIG. 8, the diameter of an eccentric weight approx. equals to the outer diameter of a motor. Since the holder plays important roles as discussed above, the holder may be a critical element of the motor. Therefore, a size of the motor viewed from the device should include the holder, and it is reasonable to give the eccentric weight a large rotating area equivalent to a size of the holder. This structure allows the following two subjects to be compatible; i.e., (a) obtaining necessary vibrations, and (b) the outer diameter of the motor including the holder falling within a maximum permissible value.

Further, in the motor used in the third embodiment, an axial position of the gravity center of weight 313 falls within the area of bearing 273, so that most of load to the rotor is borne by bearing 273 and thus bearing 283 bears little of that. Alleviating the load to bearing 283 allows the motor to employ a slim bearing, so that a slim motor with high reliability is achievable.

(Fourth Exemplary Embodiment)

Figure 7:
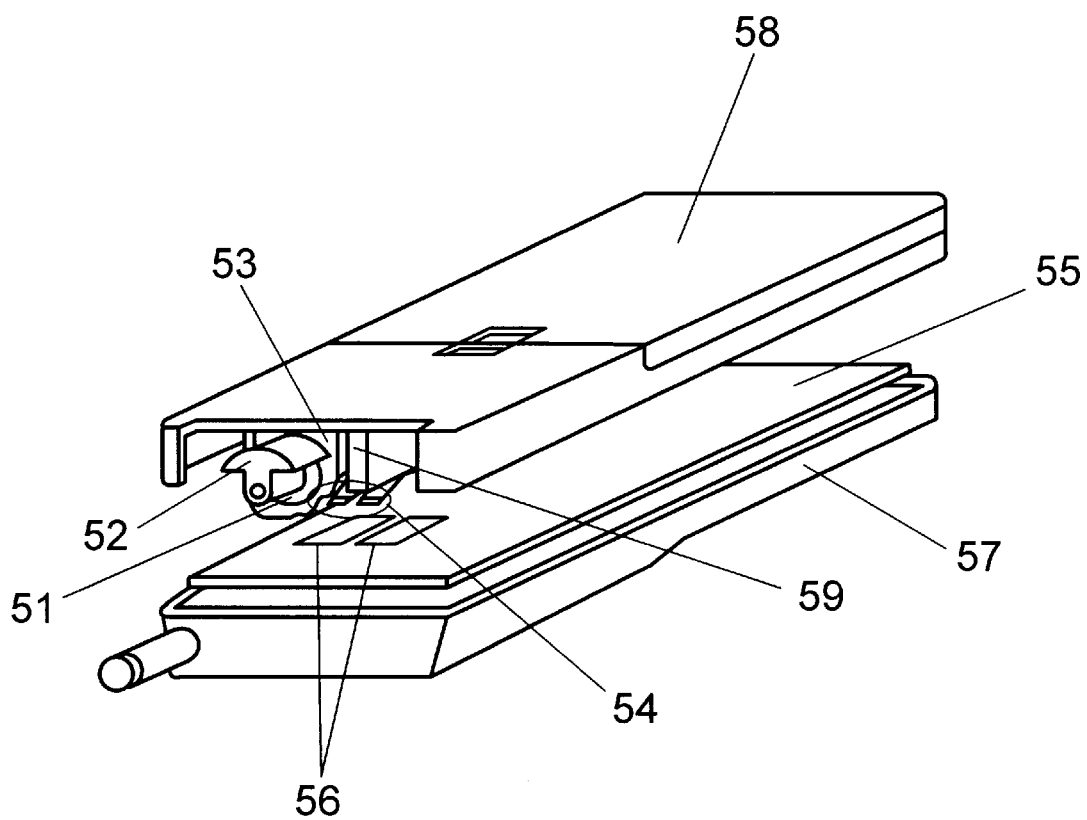
FIG. 7 is a perspective exploded view showing a structure of a device in accordance with a fourth exemplary embodiment of the present invention.

A device to which the motor of the present invention is mounted is demonstrated hereinafter. FIG. 7 is a perspective exploded view showing a structure of the device in accordance with the fourth exemplary embodiment of the present invention.

In FIG. 7, a cellular phone represents the device. Vibration generating motor 51 is a cylindrical core-less motor and includes eccentric weight 52 on an end of motor's shaft. Motor 51 has two leaf-spring-terminals 54 functioning as powering terminals to a coil in the motor—protruding and exposing outside a frame of the motor. Further, the frame of motor 51 is surrounded by rubber holder 53, and motor 51 is held in first housing 58 by holding section 59. On the other hand, board 55 of the device is disposed in second housing 57. Powering lands 56, electric coupling sections, are formed on the board. When housing 57 is integrated with housing 58, motor 51 is sandwiched by housing 58 and board 55, and at the same time, terminals 54 are urged to lands 56.

As such, the device used in the fourth embodiment holds the vibration-generating-motor with the holder made of soft material. The powering terminals are urged to the powering lands so that electrical coupling is achieved, which eliminates soldering work to power the motor from the board. This mounting structure of the motor to the device not only achieves excellent transmission of vibrations from a motor to a device, but also realizes a slim motor mountable to a device. In other words, this structure contributes to thinning the device and reducing the weight of the device.

The present invention discussed above solves various problems due to disposing the magnet separately from the bearing in the axial direction, and achieves a small diameter of the motor. Therefore, the present invention contributes to downsizing the device and reducing the weight of the device such as a cellular phone. When a vibration motor is integrated into, e.g., a cellular phone, a total shape is determined by considering an optimum balance among every element including a holder and an eccentric weight of the motor, thereby realizing a thin motor producing greater vibrations while consuming lower power. The present invention thus contributes to achieving a thin and light-weighted device.

The previous embodiments refer to the cylindrical core-less motor for generating vibrations as an example; however, the present invention can be applied to a motor having no eccentric weight, such as various motors used in power sources for mechanisms of devices. Further, one of the embodiments refers to the motor with a brush and a commutator. However, a motor without a brush or a commutator detects a rotor position with a position detector such as a Hall element, and spins, i.e., so called a brush-less motor, also falls within a scope of the present invention. A motor without the position detector detects a rotor position with an induction voltage of a coil, and spins, i.e., so called a sensor-less motor, also falls within the scope of the present invention.

As such, the present invention is not limited by the embodiments discussed above, but applicable to various applications within the scope thereof.

What is claimed is:

1. A motor comprising:
   (a) a frame;
   (b) a pipe disposed in said frame and fixed coaxially to said frame;
   (c) a magnet including an inner wall, said pipe being positioned adjacent to the inner wall;
   (d) a coil facing an outer wall of said magnet via an annular space;
   (e) a shaft disposed coaxially with said magnet and said coil;
   (f) a first bearing disposed on an end of said frame, said first bearing supporting a first side of said shaft; and
   (g) a second bearing disposed inside said frame and at least partially disposed within said magnet, said second bearing supporting a second side of said shaft, a portion of said second bearing being positioned between the inner wall and said pipe,
   wherein a lower end of said magnet overreaches a lower end of said pipe, and said second bearing is disposed under the lower end of said pipe and fixed to the inner wall of said magnet.

2. The motor as defined in claim 1, wherein said second bearing is made of resin, and insert-molded.

3. The motor as defined in claim 2, wherein when said second bearing is insert-molded, said magnet being coupled to at least one of said pipe and said frame through said second bearing.

4. The motor as defined in claim 1, wherein a groove running in an axial direction is formed on the inner wall of said magnet.

5. The motor as defined in claim 2, wherein a groove running in an axial direction is formed on the inner wall of said magnet.

6. The motor as defined in claim 3, wherein a groove running in an axial direction is formed on the inner wall of said magnet.

7. The motor as defined in claim 1, wherein a flange, of which outer diameter is greater than an inner diameter of said magnet, is formed on a lower end of said second bearing.

8. The motor as defined in claim 2, wherein a flange, of which outer diameter is greater than an inner diameter of said magnet, is formed on a lower end of said second bearing.

9. The motor as defined in claim 3, wherein a flange, of which outer diameter is greater than an inner diameter of said magnet, is formed on a lower end of said second bearing.

10. The motor as defined in claim 1, wherein a lubricant retainer is formed on an inner wall of said second bearing.

11. The motor as defined in claim 2, wherein a lubricant retainer is formed on an inner wall of said second bearing.

12. The motor as defined in claim 3, wherein a lubricant retainer is formed on an inner wall of said second bearing.

13. The motor as defined in claim 1, wherein said shaft has an eccentric weight.

14. A motor comprising:
   (a) a frame;
   (b) a pipe disposed in said frame and fixed coaxially to said frame;
   (c) a magnet including an inner wall, said pipe being positioned adjacent to the inner wall;
   (d) a coil facing an outer wall of said magnet via an annular space;
   (e) a shaft disposed coaxially with said magnet and said coil;
   (f) a first bearing disposed on an end of said frame, said first bearing supporting a first side of said shaft;
   (g) a second bearing disposed inside said frame and at least partially disposed within said magnet, said second bearing supporting a second side of said shaft, a portion of said second bearing being positioned between the inner wall and said pipe; and
   (h) an eccentric weight including a shaft fixing section and a weight section, wherein an outer diameter of the weight section is greater than that of said frame, an axial length of the weight section is longer than that of the shaft fixing section, and a gravity center position in an axial direction of said eccentric weight falls within an area of an axial length of said first bearing.

15. A device incorporating a motor, the motor comprising:
   (a) a frame;
   (b) a pipe disposed in said frame and fixed coaxially to said frame;
   (c) a magnet including an inner wall, said pipe being positioned adjacent to the inner wall;
   (d) a coil facing an outer wall of said magnet via an annular space;
   (e) a shaft disposed coaxially with said magnet and said coil;
   (f) a first bearing disposed on an end of said frame, said first bearing supporting a first side of said shaft;
   (g) a second bearing disposed inside said frame and at least partially disposed within said magnet, said second bearing supporting a second side of said shaft, a portion of said second bearing being positioned between the inner wall and said pipe; and
   (h) an eccentric weight including a shaft fixing section and a weight section, wherein an outer diameter of the weight section is greater than that of said frame, an axial length of the weight section is longer than that of the shaft fixing section, and a gravity center position in an axial direction of said eccentric weight falls within an area of an axial length of said first bearing,
   wherein the motor is at least partially surrounded by a holder in the device, the holder being at least partially formed of a soft material.

16. A device comprising:
   (a) a housing;
   (b) a motor mounted to said housing, said motor comprising:
      (b-1) a frame;
      (b-2) a powering terminal exposed outside said frame;
      (b-3) a pipe disposed in said frame and fixed coaxially to said frame;
      (b-4) a magnet including an inner wall, said pipe being positioned adjacent to the inner wall;

(b-5) a coil facing an outer wall of said magnet via an annular space;

(b-6) a shaft disposed coaxially with said magnet and said coil;

(b-7) a first bearing disposed on an end of said frame, said first bearing supporting a first side of said shaft;

(b-8) a second bearing disposed inside said frame and at least partially disposed within said magnet, said second bearing supporting a second side of said shaft, a portion of said second bearing being positioned between the inner wall and said pipe;

(b-9) an eccentric weight including a shaft fixing section and a weight section, wherein an outer diameter of the weight section is greater than that of said frame, an axial length of the weight section is longer than that of the shaft fixing section, and a gravity center position in an axial direction of said eccentric weight falls within an area of an axial length of said first bearing, and (c) a board including an electric coupling section for powering said coil through said powering terminal.

17. The device as defined in claim 16, wherein said motor is at least partially surrounded by a holder in the device.

18. The device as defined in claim 17, wherein the holder is made of soft material.

19. The device as defined in claim 16, wherein said motor is sandwiched by said housing and said board so that said powering terminal is urged to the electric coupling section.

20. The device as defined in claim 19, wherein said motor is at least partially surrounded by a holder in the device, the holder being at least partially formed of a soft material.

* * * * *